US006412425B1

(12) United States Patent
Chen (10) Patent No.: US 6,412,425 B1
(45) Date of Patent: *Jul. 2, 2002

(54) FOLDABLE STEERING WHEEL TABLE

(76) Inventor: Zhong Yu Chen, 2018 Evans La., Appt. No. 4, San Jose, CA (US) 95125

( * ) Notice: Subject to any disclaimer, the term of this patent is extended or adjusted under 35 U.S.C. 154(b) by 92 days.

This patent is subject to a terminal disclaimer.

(21) Appl. No.: 09/735,557

(22) Filed: Dec. 12, 2000

(51) Int. Cl.$^7$ ............................................. A47B 23/00
(52) U.S. Cl. ......................................................... 108/44
(58) Field of Search ................................ 108/44, 45, 1

(56) References Cited

U.S. PATENT DOCUMENTS

| | | | | |
|---|---|---|---|---|
| 2,856,251 A | * | 10/1958 | Garrison | 108/44 |
| 3,643,606 A | * | 2/1972 | Vise | 108/44 |
| 4,749,161 A | | 6/1988 | Falcone | 108/44 X |
| 4,890,559 A | | 1/1990 | Martin | 108/44 |
| 4,995,637 A | | 2/1991 | Muraishi | 108/44 X |
| D319,357 S | | 8/1991 | Horne | |
| 5,085,153 A | * | 2/1992 | McKee | 108/25 X |
| 5,177,665 A | * | 1/1993 | Frank et al. | 108/44 X |
| D335,226 S | | 5/1993 | Horne | |
| 5,386,785 A | * | 2/1995 | Naor | 108/44 |
| 5,413,035 A | | 5/1995 | Fernandez | 108/44 |
| 5,487,521 A | | 1/1996 | Callahan | 108/44 X |
| 5,511,493 A | * | 4/1996 | Kanehl, Jr. | 108/44 |
| 5,558,026 A | * | 9/1996 | Seibert | 108/44 |
| D374,203 S | | 10/1996 | Martinez | |
| 5,662,047 A | * | 9/1997 | Metcalf | 108/44 |
| 5,749,305 A | | 5/1998 | Jacovelli | 108/44 |
| 5,749,306 A | | 5/1998 | Breuner | 108/44 |
| 5,845,585 A | * | 12/1998 | Meeus et al. | 108/44 |
| D437,273 S | | 2/2001 | Chen | |
| 6,279,800 B1 | * | 8/2001 | Lee | 108/44 X |

FOREIGN PATENT DOCUMENTS

| CA | 885350 | 11/1971 |
|---|---|---|
| GB | 1550899 | 8/1979 |

* cited by examiner

*Primary Examiner*—Jose V. Chen

(57) ABSTRACT

A foldable table for steering wheel with features and devices that include: a table angle control (9), a springing strip (31), a limit stopper (32) and reinforcing rib (34) on the support (3) to restrict the foldable table not to fall apart in fold-up position for easy carrying and storage; different ways of easily and rigidly mounting the foldable table on a steering wheel which can be removed just as easily as mounting; and a oblong slot on the surface of the foldable table for storage of pens, utensils, etc.

16 Claims, 13 Drawing Sheets

FOLDABLE STEERING WHEEL TABLE

BACKGROUND

1. Field of Invention

This invention relates to a unique horizontally foldable steering wheel table, which is easy to carry and handle, will not open apart easily without an extra force in a folded-up position, and can be easily and rigidly mounted in different ways on a steering wheel of a motor vehicle, for use by a person sitting behind the steering wheel for reading, writing, eating, using lap-top computer, and cosmetics, when the vehicle is in parking position.

2. Description of Prior Art

A number of devices have been created to provide a steering wheel table, some of those are foldable, but none of them will provide such a foldable steering wheel table that will not easily fall apart when in folded-up position.

Also, those previous inventions have problems to easily and rigidly mount a steering wheel table on a steering wheel of a motor vehicle. None of these inventions are efficient enough to solve all the problems.

U.S. Pat. No. 5,749,306 to Breuner (1998) discloses a portable steering wheel mounted computer table.

a) This device is mounted on a steering wheel by a shock cord. This structure is not practical and rigid. The table will not be in balance, especially when there is an air bag bump on the steering wheel.

b) It does not posses a neat and uniform appearance and looks unstable by using a shock cord or similar material when placing an expensive and heavy laptop computer on it.

c) This device has nothing to prevent or stop a force from under the table surface, which may knock the table off the steering wheel and damage the expensive computer.

U.S. Pat. No. 5,749,305 to Jacovelli (1998) discloses a tray for use in automobiles for placing food, drink or others.

d) By design, this device looks not stable enough on a steering wheel and the two end of the tray may go up and down like a seesaw.

U.K. Pat. No. GB1,550,890 to Hardy (1979) discloses a foldable steering wheel table with two hooks hanging on a steering wheel.

e) By design, this device has nothing to prevent or stop a force from under the table surface, which may knock the table off the steering wheel, and it will not be useful when there is an air bag bump on the steering wheel.

f) Though this device can be folded up when not in use, the table surface board will be unfolded by itself without a lock, which is not convenient for carrying.

U.S. Pat. No. 5,558,026 to Seibert (1996) discloses a tray for use on a steering wheel.

g) This device, which has a pocket on the top of the tray to hang on a steering wheel but has nothing else to stable the device on a steering wheel, is very easy to fall off and not stable.

h) All of the above described inventions has no device to place or store pans, spoons, forks, other utensils, etc. on a table surface.

Objects and Advantages

Several objects and advantages of my invention include those that:

a) will not open by itself when in folded-up position;

b) require an extra force to separate and unfold the support and table surface;

c) is easy for carrying;

d) there is an oblong slot on the table surface for placing pen, utensils, etc.;

e) by using latch or catch on the support, will greatly increase the easiness and stability of the foldable steering wheel table on a steering wheel;

f) uses different ways of latch or catch to mount a steering wheel table for different steering wheels;

g) by using a catch or latch, will reduce the overall size of a steering wheel table;

h) by using one or more moveable catches or latches that can move along the support, will fit and mount on different point and place on a steering.

DRAWING FIGURES

In the drawings, closely related figures have the same number but different alphabetic suffixes.

FIG. 2 through FIG. 6 shows the views when the support and table surface are in a position of 90 degree.

FIG. 8E to FIG. 8G show several positions of the close-open limitation structure.

FIG. 8F shows the position of the limit stopper (on the tip of the springing strip) on the reinforcing rib in a sectional view at the point of 8E—8E.

Reference Numbers in Drawings 1. table
2. cup slot
3. support with front half clamp
4. back half clamp
5. clamp spring
6. clamp axle
7. table axle sleeve
8. table axle
9. table angle control
10. angle-adjusting wheel axle
11. angle-adjusting wheel
12. angle-control polygonal flange plate
13. angle-adjusting wheel spring
14. angle-adjusting wheel spring cover
15. angle-adjusting wheel screw
16. steering wheel
17. steering wheel in sectional view
18. angle-adjusting wheel axle in sectional view
19. angle-adjusting wheel axle's square end
20. flange point on a table angle control
21. recess holes in angle-adjusting wheel
22. surface of angle-control polygonal flange plate
23. side of angle-control polygonal flange plate
24. 45 degree chamfer angle on the inner edge of angle-adjusting wheel
25. reinforcing rib for table surface
26. side of table surface
27. inner sidewall
28. radian of inner side of a clamp
29. round hole on an angle-control polygonal flange plate
30. square hole on angle-control polygonal flange plate
31. springing strip
32. limit stopper
33. table surface
34. reinforcing rib for table angle control
35. wall of cup slot
36. sectional view of a steering wheel bar
37. back view of a steering wheel bar
38. springing snap latch or catch
39. snap latch or catch
40. lock of latch or catch
41. lock of latch or catch
42. single-hinge snap latch or catch
43. double-hinge snap latch or catch
44. hinge link
45. seat of moveable latch or catch
46. latch or catch
47. hinge link
48. reinforcing rib for support
49. axle of hinge
50. oblong slot DESCRIPTION—FIGS. 1 to 13

Figure 1:
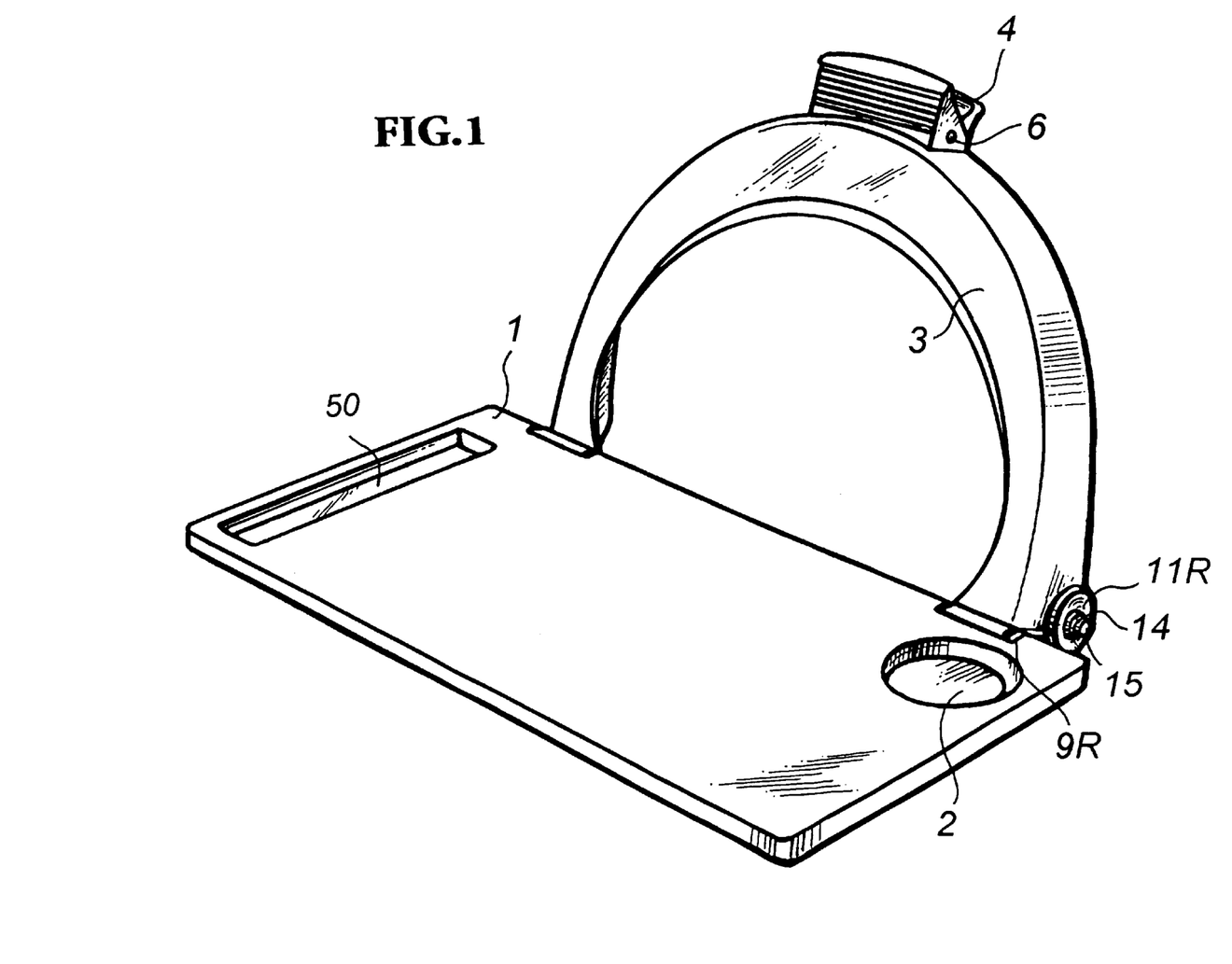
FIG. 1 shows a support table in perspective view assembled of the various parts of a typical embodiment.

FIG. 1 illustrates a detailed embodiment of the present invention.

Figure 1A:
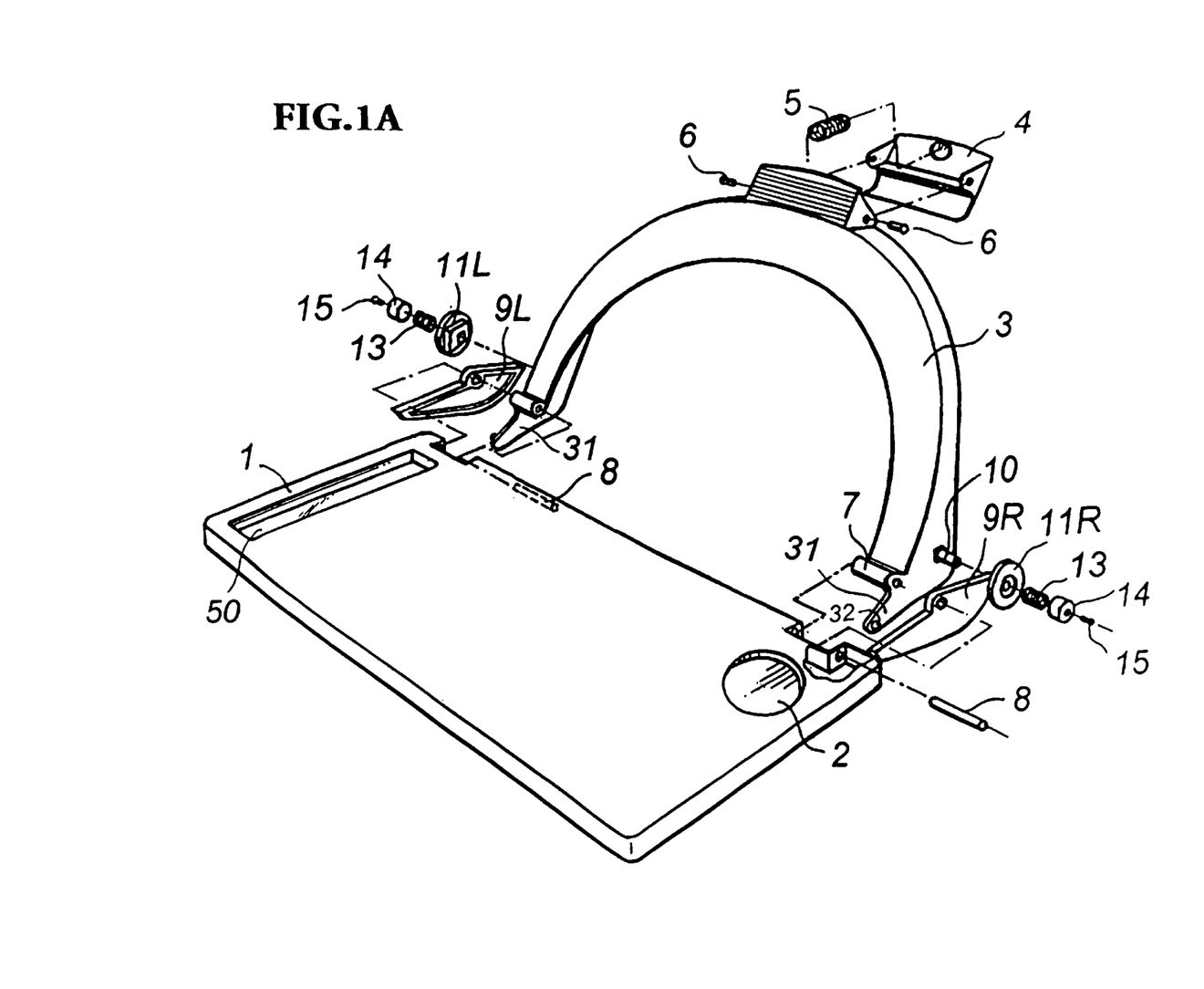
FIG. 1A shows a table in perspective exploded view and the association of various parts.
Figure 5:
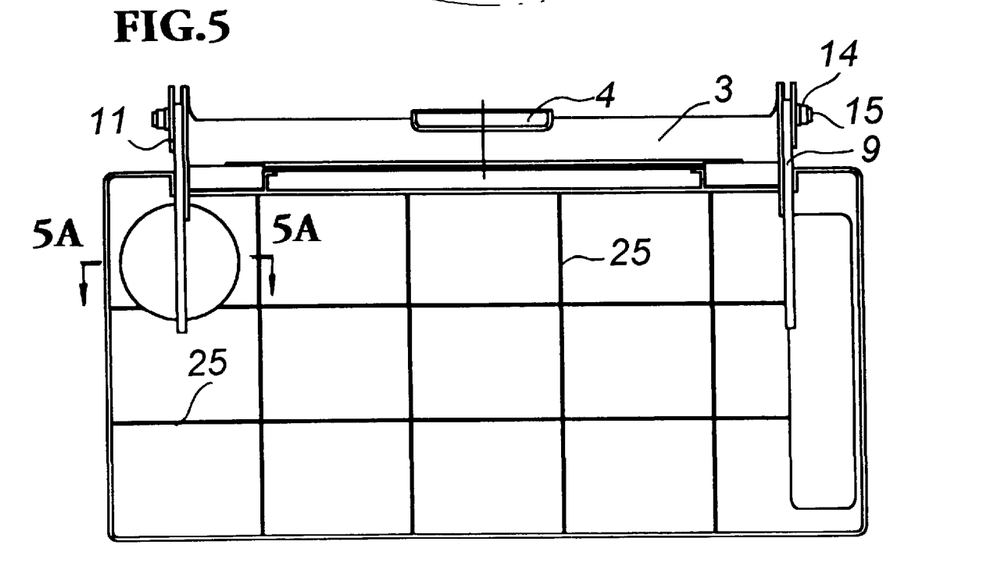
FIG. 5 shows a table in bottom side view.

FIG. 1A and FIG. 5 show all parts of the present invention. Except springs and screws, this device can be constructed with plastic material, such as ABS, polystyrene, and polypropylene. The thickness of all walls of every part does not exceed 3 mm for big parts, and 1 to 1.5 mm for small parts. The thickness of the reinforcing ribs for the table will not exceed 1.5 mm. The table 1 comprises of a surface board 33, 4 sidewalls 26 and reinforcing ribs 25.

FIG. 2 through FIG. 6 shows the views when the support and table surface are in a position of 90 degree.

Figure 2:
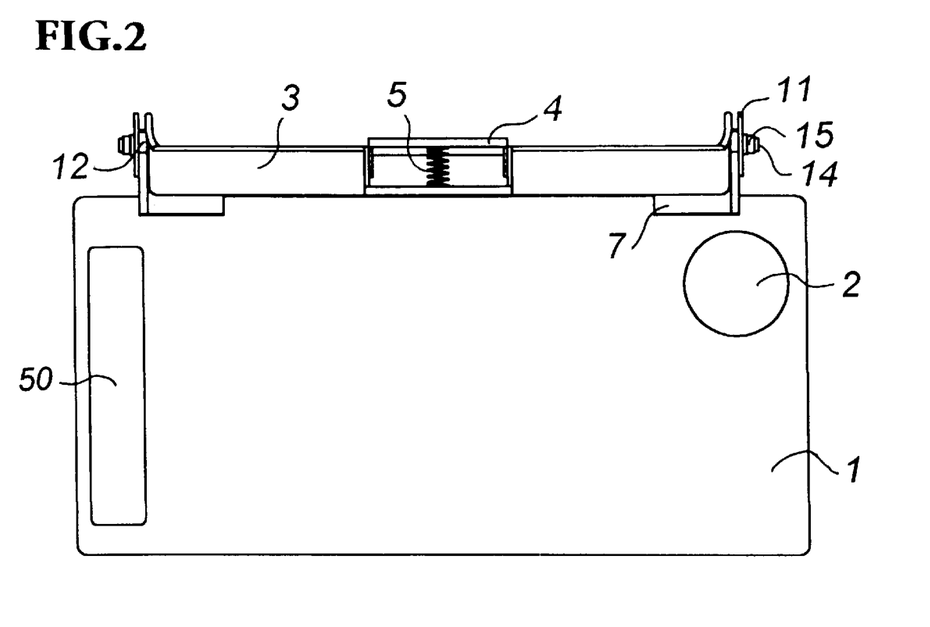
FIG. 2 shows a table in topside view assembled of the various parts.

FIG. 2 shows a table 1 wider than a steering wheel and a cup slot 2 position on the table 1.

Figure 3:
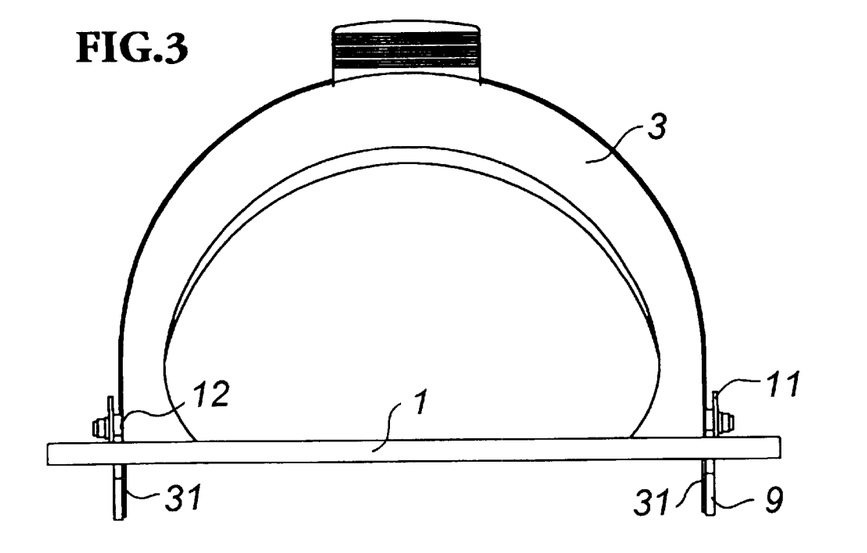
FIG. 3 shows a table in front side view.

FIG. 3 shows a front view of an arch shape support 3 with a clamp on it.

Figure 4:
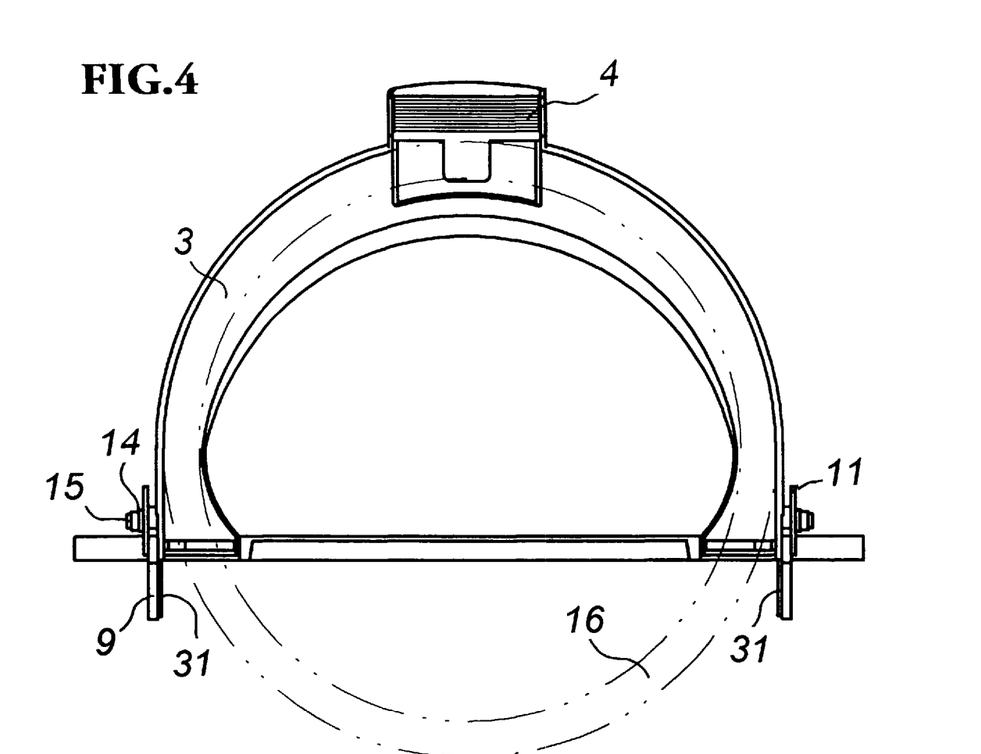
FIG. 4 shows a table in back side view.

FIG. 4 shows that the radian of the inner sidewall 27 of the support is similar with the radian of the outside edge of most steering wheels. This device will fit for mounting on different motor vehicles. The back half clamp 4 is connected with the support 3 by clamp axle 6. The top and bottom edges of the back half clamp 4 is designed to have a similar radian of the outside edge of a steering wheel, and the inner side of the back half clamp is also designed to have a similar radian of the ring of a steering wheel. With the force of the clamp spring 5, the device is rigidly mounted on a steering wheel. The device will not shift or move in any directions. Number 16 is a steering wheel in the support 3.

FIG. 5 shows a table in bottom side view. Number 25 is the reinforcing ribs with same thickness to strengthen the table surface.

Figures 5A, 6:
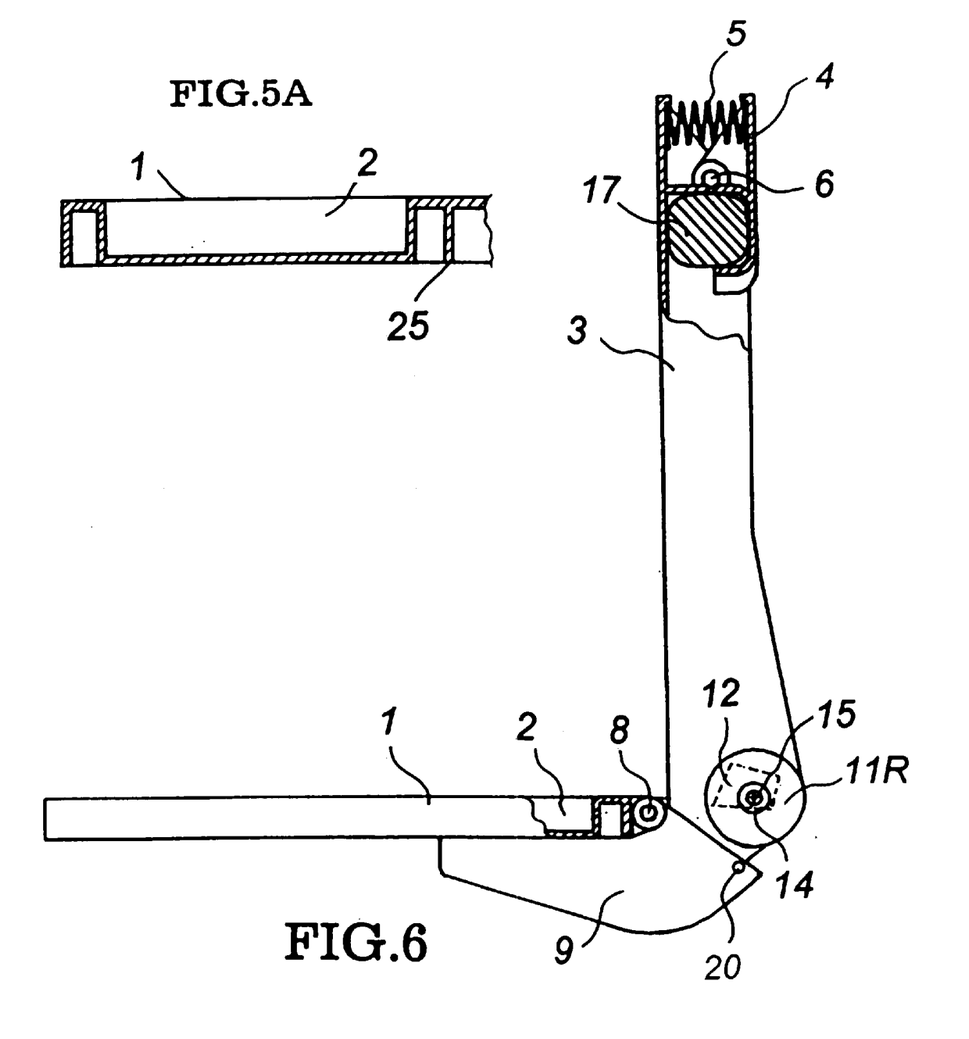
FIG. 5A shows a cup slot in a sectional view.
FIG. 6 shows a table in right side view and the association of various parts of a typical embodiment.

FIG. 5A shows a cup slot 2 in a sectional view. The depth of the slot is the same as the reinforce rib 25.

FIG. 6 shows that the table 1 may be constructed in a single part with the table angle control 9 in casting, in order that the table angle control 9 will move and push the table 1 up and down. Number 17 is a steering wheel in sectional view in the support 3.

FIGS. 7A to 7D show that the angle-adjusting wheel 11 and angle-control polygonal flange plate 12 are connected to each other and are constructed as one part in casting. The plate is an irregular polygon, could be (4 sided) irregular quadrilateral or (5 sided) irregular pentagon, depending on how many adjusting levels are desired. One more side will add one more different level.

Figure 7A:
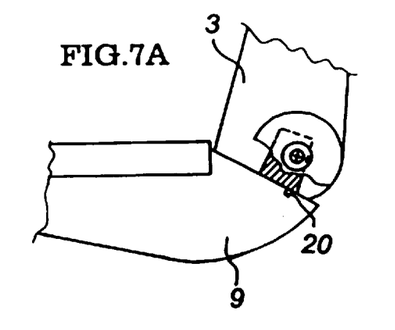
FIGS. 7A through 7D shows 4 different angle positions of the support and table surface by turning angle-adjusting wheels.
Figure 7B:
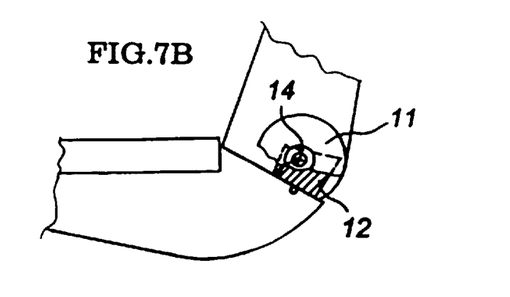
Figure 7C:
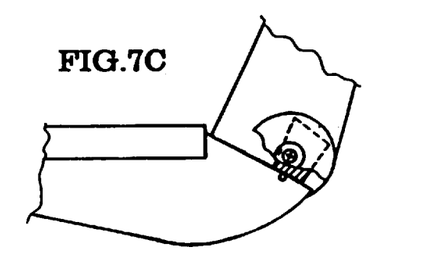
Figure 7D:
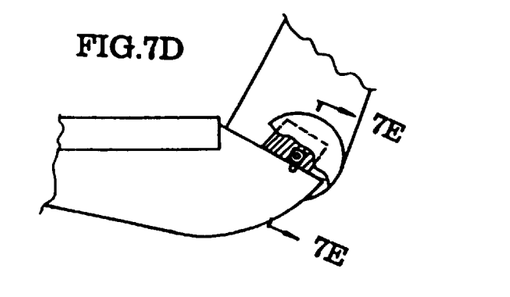
Figure 7E:
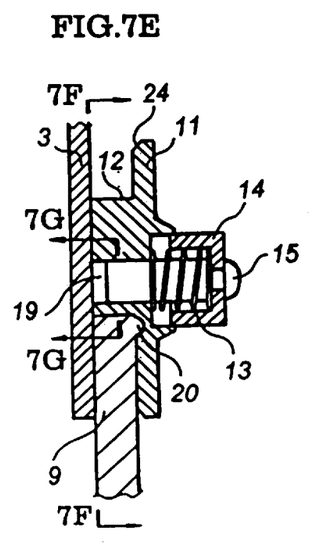
FIG. 7E shows an angle-adjusting wheel in a sectional view.
Figure 7F:
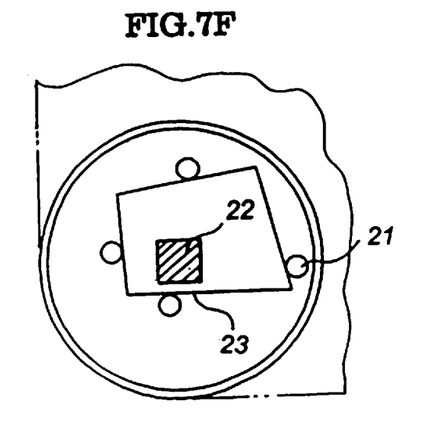
FIG. 7F shows an angle-adjusting wheel in back side view.

FIG. 7E is an angle-adjusting wheel 11 in a sectional view, and FIG. 7F is an angle-adjusting wheel 11 in back view. FIGS 7E and 7F show that the polygonal plate 12 has a square hole 29 in the middle in 2 mm deep, then changes into a round hole 29 all the way through. In corresponding to this specially designed hole, the angle-adjusting wheel axle 10 has the same characters and its bottom end 19 is square too. As forced down by the angle-adjusting wheel spring 13, the angle-adjusting wheel axle's square end 19 goes into the polygonal plate square hole 30. Thus, the angle-adjusting wheel 11 is locked and will not turn or rotate. The position of the angle-control polygonal flange plate 12 determines the position of the table angle control 9 and the angle of the table 1. Because the radius of the each side of the polygonal plate 12 to the middle point of the angle-adjusting wheel 11 is different.

Figure 7G:
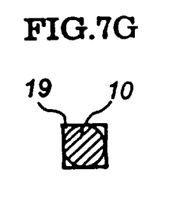
FIG. 7G shows an angle adjusting wheel axle in a sectional view.

FIG. 7G is an angle adjusting wheel axle 10 in a sectional view, showing that the axle is a cylinder with a square end.

Figure 8:
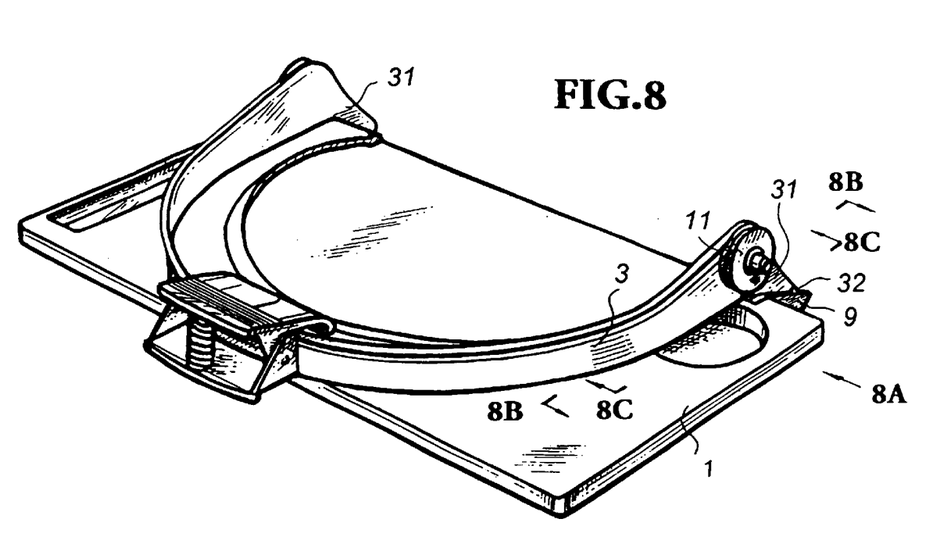
FIG. 8 shows the foldable steering wheel table with a clamp in the folded-up position in perspective view assembled of the various parts of a typical embodiment.
Figure 8A:
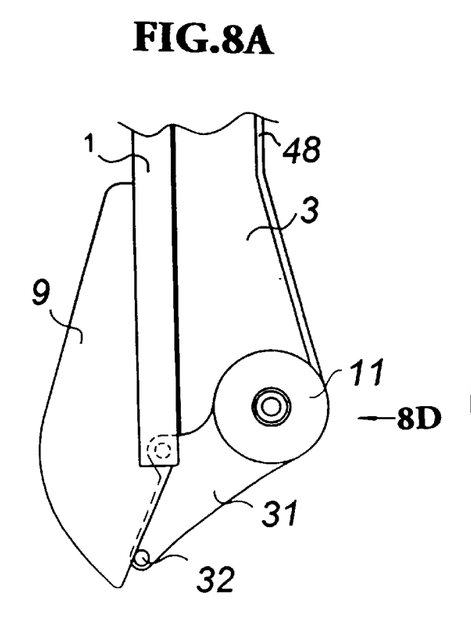
FIG. 8A shows the side view (from direction of A)
Figure 8B:
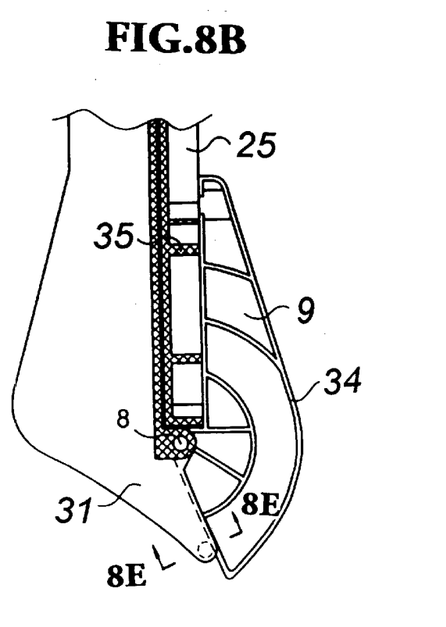
FIG. 8B shows the inner structure of a table angle control in a sectional view at the point of 8B—8B.
Figure 8C:
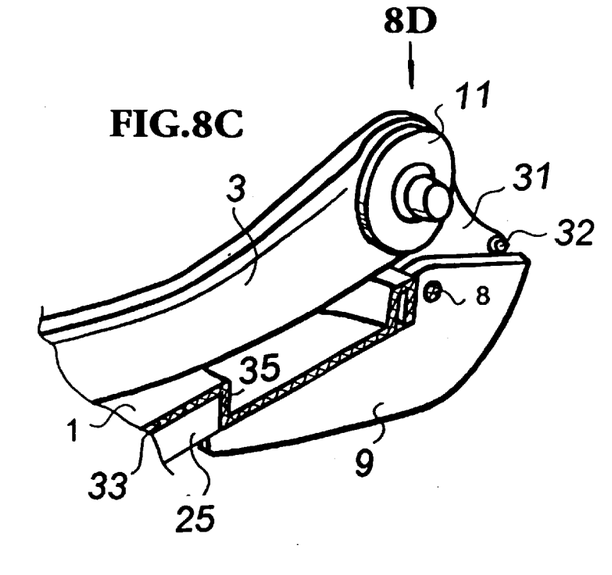
FIG. 8C shows the whole view of the table angle control in the folded-up position in a sectional view at the point of 8C—8C.
Figure 8D:
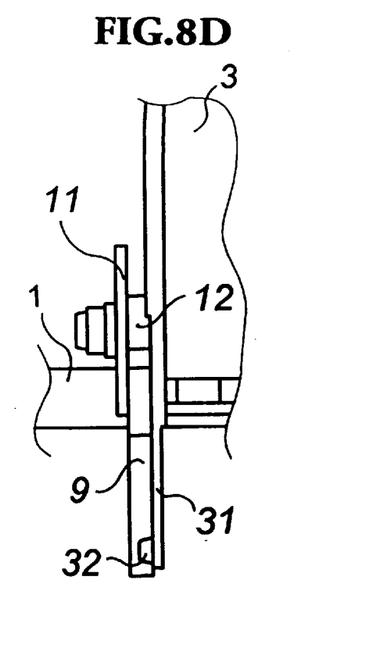
FIG. 8D shows part of the steering wheel table in the topside view (from the direction of D).

FIG. 8 shows the foldable steering wheel table with a clamp in the folded-up position in perspective view assembled of the various parts of a typical embodiment. Because of the resistance from the limit stopper 32, the angle between the table 1 and support 3 will not change unless with an extra force to separate the table and support.

Figure 8E:
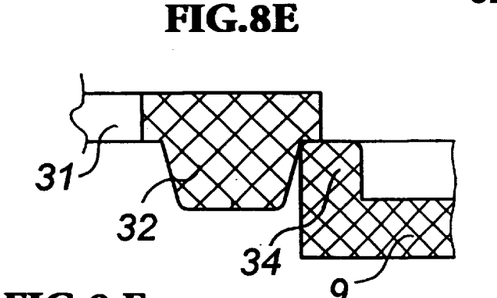
FIG. 8E shows the limitation structure in the closed position of the steering wheel table in a sectional view at the point of 8E—8E.
Figure 8G:
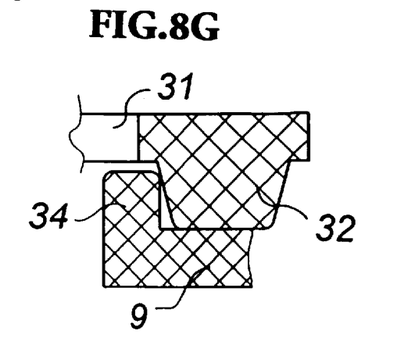
FIG. 8G shows the position of the limit stopper (on the tip of the springing strip) over the reinforcing rib in a sectional view at the point of 8E—8E.

FIG. 8E shows the folded-up position at the point of 8E—8E. FIG. 8G shows that the limit stopper 32 is over the reinforcing rib 34 for table angle control into FIG. 8G open-up position after the springing strip bends and passes the position of FIG. 8F. If the table is being folded up with an extra force, the limit stopper 32 will go over the reinforcing rib 34 for table angle control again to the position of FIG. 8E. This ensures that the steering wheel table will not folded-up or open by itself without any extra force.

Figure 9:
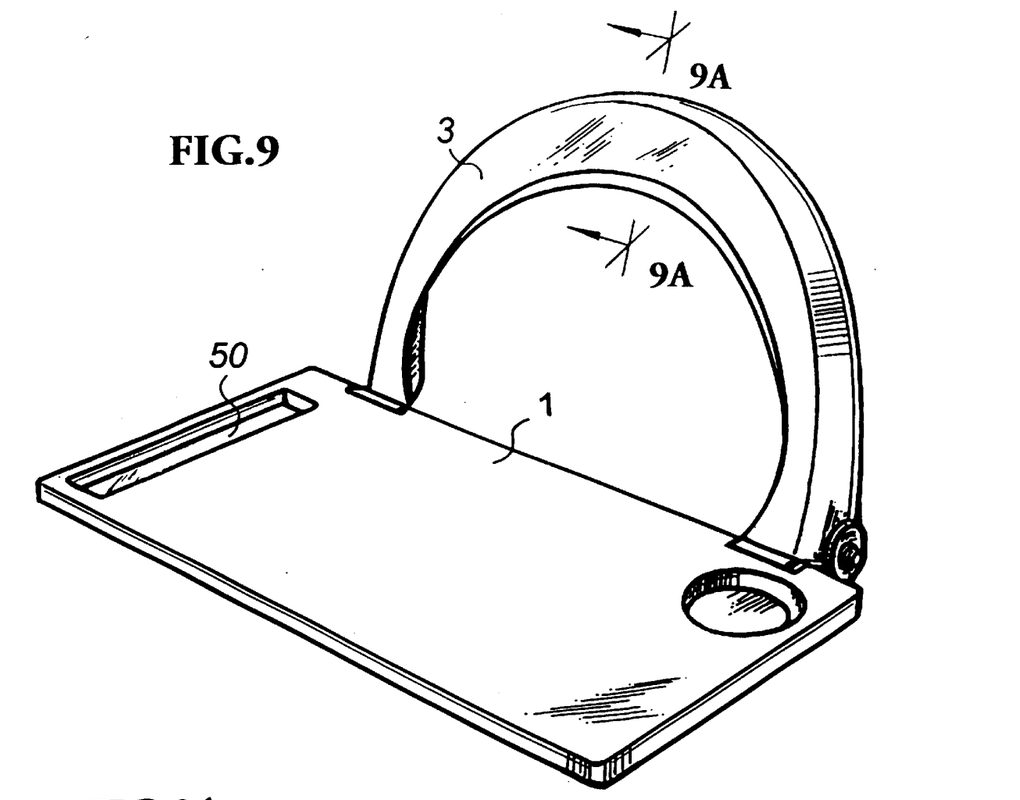
FIG. 9 shows the steering wheel table without clamp in the open position in perspective view assembled of the various parts of a typical embodiment.

FIG. 9 shows an alternative way (instead of clamp) to stabilize the support 3 on a steering wheel. A springing snap latch or catch 38 is used and molded in manufacturing on the support 3. This springing snap latch or catch 38 can be made of plastic or stainless steel.

Figure 9A:
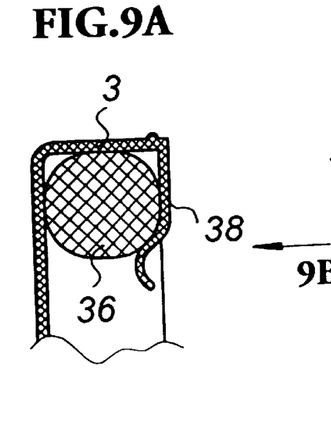
FIG. 9A shows the support with the springing snap catch in a sectional view at the point of 9A—9A.
Figure 9B:
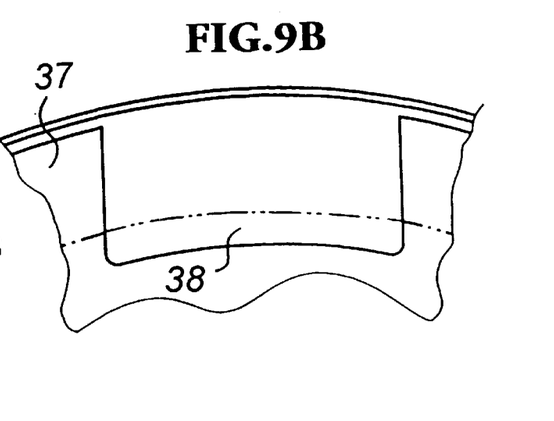
FIG. 9B shows the back view of the springing snap catch from the direction of 9B.

FIG. 9A shows the support 3 with the springing snap latch or catch 38 in a sectional view. The lower part of the latch or catch 38 is curved inwards, thus requires an extra force to push the support 3 and springing snap latch or catch 38 on to a steering wheel. The steering wheel table will not fall away without an extra force to pull it out.

Figure 10:
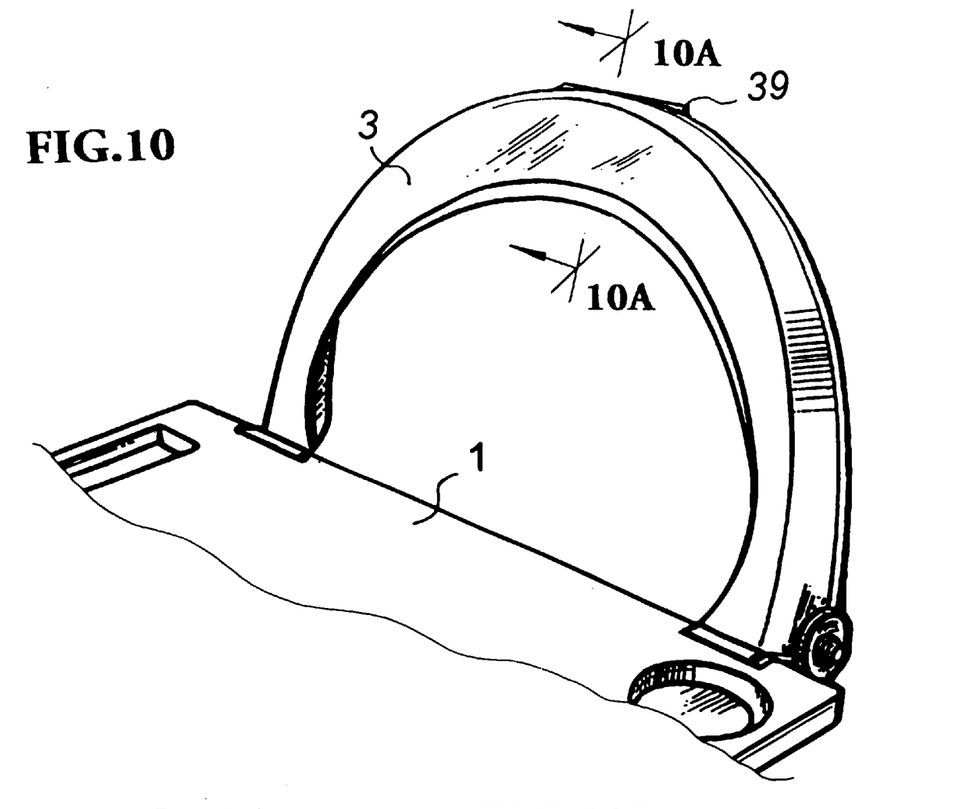
FIG. 10 shows the steering wheel table support in the open position with snap latch in perspective view.
Figure 10A:
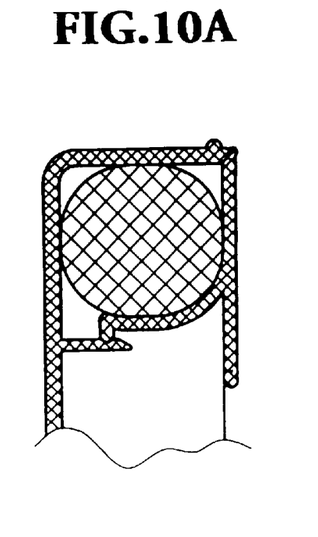
FIG. 10A shows the support with the snap latch in the closed position in a sectional view at the point of 10A—10A.
Figure 10B:
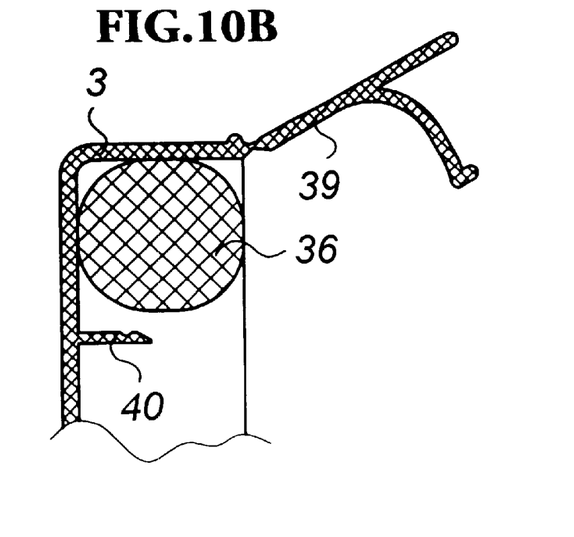
FIG. 10B shows the support with the snap latch in the open position in a sectional view at the point of 10A—10A.

FIG. 10 shows another design of a latch or catch to stabilize the support 3 on a steering wheel. A snap latch or catch 39, that is molded in manufacturing on the support 3, and a lock 40 are used. FIG. 10A shows the support 3 with the snap latch or catch 39 in the closed position. FIG. 10B shows the supports 3 with the snap latch or catch 39 and lock 40 in the open position. A certain force is required to close or open the latch or catch 39 in order to mount or dismount the steering wheel table on or from a steering wheel.

Figure 11:
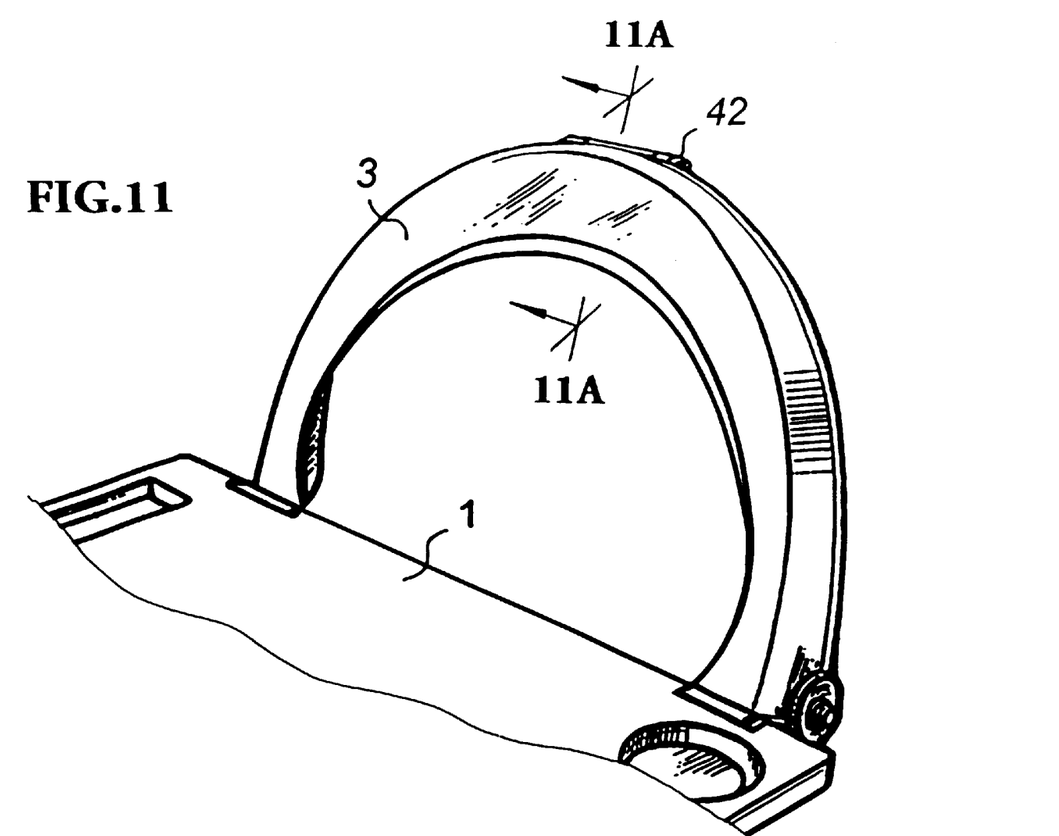
FIG. 11 shows the steering wheel table support in the open position with single-hinge latch in perspective view.
Figure 11A:
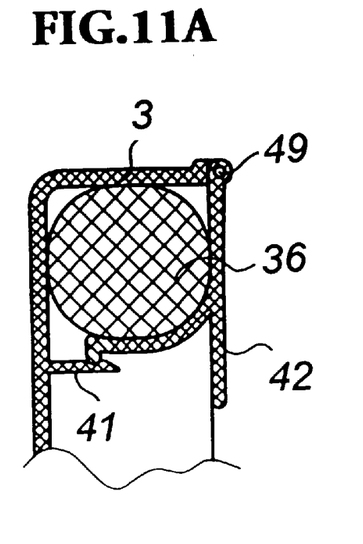
FIG. 11A shows the support with the single-hinge latch in the closed position in a sectional view at the point of 11A—11A.
Figure 11B:
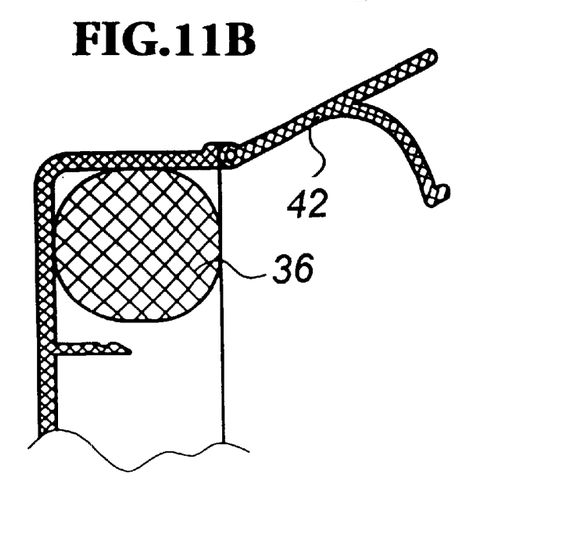
FIG. 11B shows the support with the single-hinge latch in the open position in a sectional view at the point of 11A—11A.

FIG 11 shows another design of a latch or catch to stabilize the support 3 on a steering wheel. A single-hinge snap latch or catch 42, that us pivotally linked by an axle 49 on the support 3, and a lock 41 are used. FIG. 11A shows the support with the single-hinge snap latch or catch 42 in the closed position. FIG. 11B shows the support 3 with the single-hinge snap latch or catch 42 in the open position. A certain force is required to close or open the latch or catch 42 in order to mount or dismount the steering wheel table on or from a steering wheel.

Figures 12, 12A, 12B:
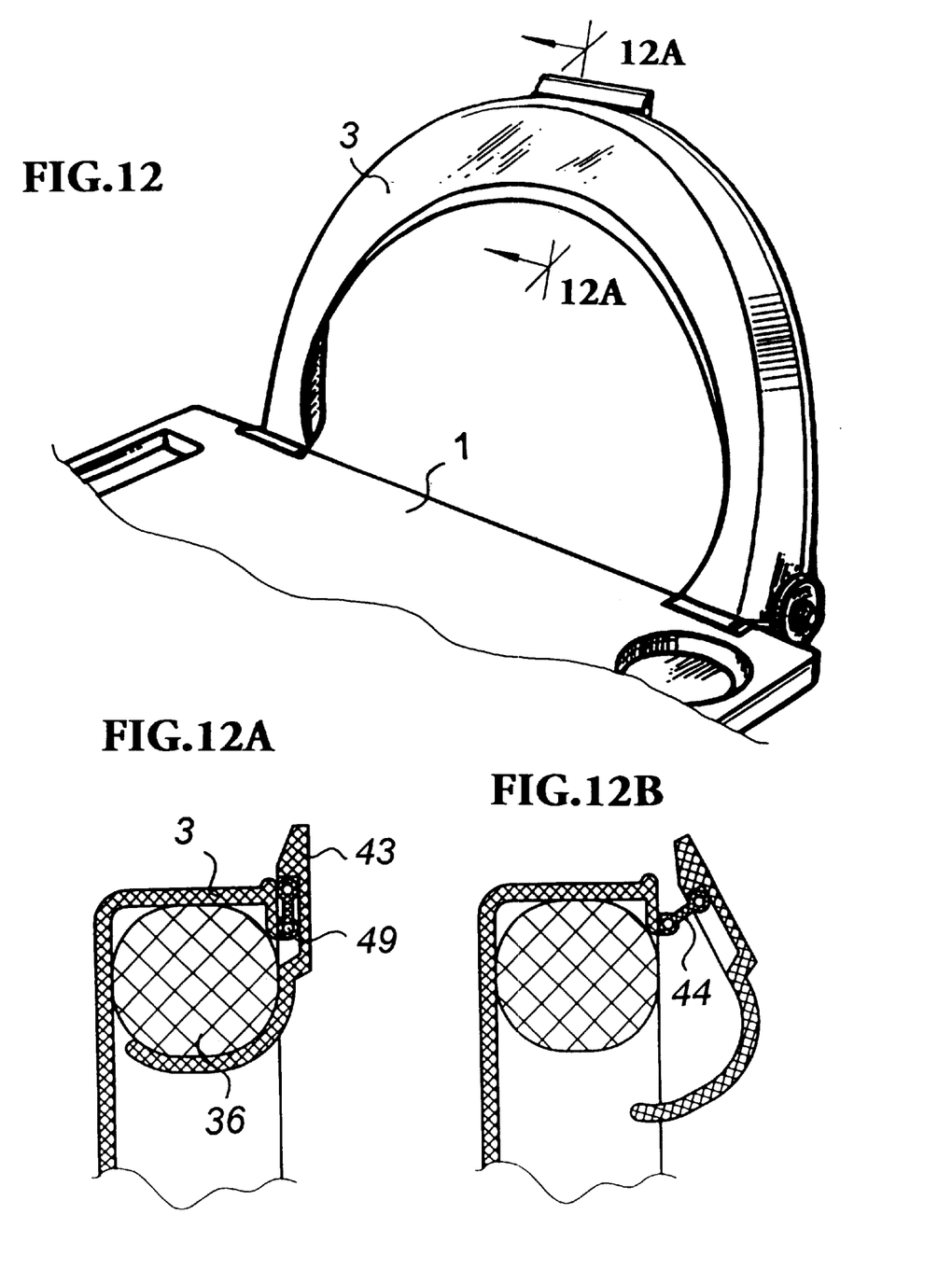
FIG. 12 shows the steering wheel table support in the open position with double-hinge latch in perspective view.
FIG. 12A shows the support with the double-hinge latch in the closed position in a sectional view at the point of 12A—12A.
FIG. 12B shows the support with the double-hinge latch in the open position in a sectional view at the point of 12A—12A.

FIG. 12 shows another design of a latch or catch to stabilize the support 3 on a steering wheel. A double-hinge snap latch or catch 43 that is pivotally linked by axles 49 on the support 3 is used. Two hinges are linked by hinge link 44. FIG. 12A shows the support 3 with the double-hinge snap latch or catch 43 in the closed position. FIG. 12B shows the support 3 with the double-hinge snap latch or catch 43 in the open position. A certain force is required to close or open the latch or catch 43 in order to mount or dismount the steering wheel table on or from a steering wheel.

Figure 13:
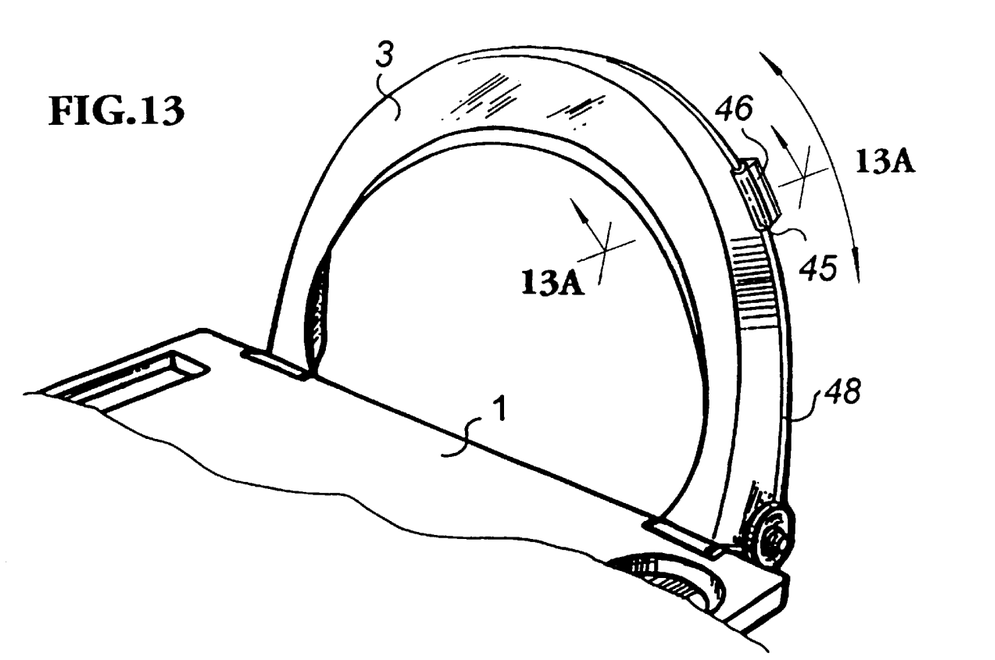
FIG. 13 shows the steering wheel table support in the open position with a moveable latch in perspective view.
Figure 13A:
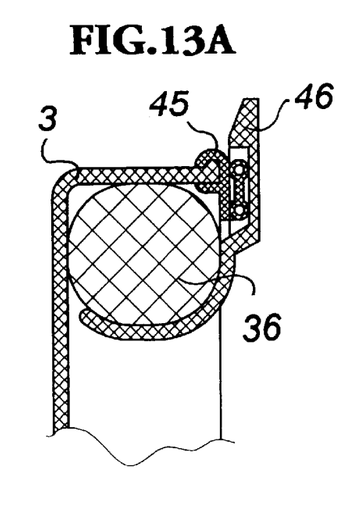
FIG. 13A shows the support with the moveable double-hinge latch in the closed position in a sectional view at the point of 13A—13A.
Figure 13B:
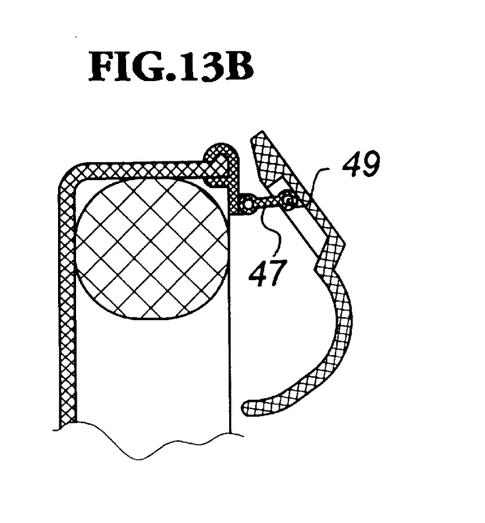
FIG. 13B shows the support with the moveable double-hinge latch in the open position in a sectional view at the point of 13A—13A.

FIG. 13 shows another design of a latch or catch to stabilize the support 3 on a steering wheel. A moveable snap latch or catch 46 is used and is pivotally linked by axles 49 on a moveable latch or catch seat 45 which, in turn, is mounted on the reinforcing rib 48 for support 3. Thus, the moveable snap latch or catch 46 can move along the reinforcing rib 48 for a best position to lock the support 3 on a steering wheel. FIG. 13A shows the support 3 with the moveable latch or catch 46 in a closed position. FIG. 13B shows the support 3 with the moveable latch or catch 46 in an open position. A certain force is required to close or open the latch or catch 46 in order to mount or dismount the steering wheel table on or from a steering wheel.

Operation—FIG. 4, FIG. 6, FIG. 7 and FIG. 8 THROUGH FIG. 13

FIG. 4, FIG. 6 and FIG. 7 illustrate an embodiment showing how the present invention works.

FIG. 4 and FIG. 6 show that the device mounted on a steering wheel with a clamp 4 and the support 3.

FIG. 7 shows a serial of positions of the angle-adjusting wheel and the different angles between the table 1 and the support 3.

If you need to change the table surface angle or level, simply pull up the angle-adjusting wheel 11 for about 3 mm and turn to a desired position. When the angle-adjusting wheel 11 is released, the wheel will go back down as forced by the angle control spring 13, and there will be a snap sound when flange point 20 on the table angle control 9 goes into a respective recess hole 21 in angle-adjusting wheel 11.

In the illustration of this invention, a 4-sided irregular quadrilateral is used for the angle-control polygonal flange plate 12. Every 90-degree is a position point for the table angle control 9. By turning the angle-adjusting wheel 11 to a different position, the radius of each side of the polygonal plate 12 to the middle point of the angle-adjusting wheel 11 is changed, which in turn changes the angle (position) of the table angle control 9 and eventually changes the angle between the table 1 and the support 3.

There is one angle-adjusting wheel 11 on each side of the support 3. It is necessary to adjust both wheels at the same time to the same position point. The position point on the wheel is indicated by numbers 1, 2, 3, 4, etc. For use on the same steering wheel, one time adjustment is enough.

FIG. 8 through FIG. 13 illustrate the operation of folding-up and opening-up the foldable steering wheel table with different latches or catches.

Summary, Ramification, and Scope

Thus, the reader will see that the table of this invention can be folded up for easy carrying and storage, will not fall apart from the fold-up position without any extra force, and can be easily and rigidly mounted on a steering wheel,and can be removed just as easily as mounted.

Although the description above contains many specifications, these should not be construed as limiting the scope of the invention but as merely providing illustrations of some of the presently preferred embodiments of this invention. For example, the latch can be catch, more than one latch or catch can be used on the support of this invention. Therefore, the scope of the invention should be determined by the appended claims and their legal equivalents, rather than by the examples given here either in writing or drawings.

I claim:

1. In an improved foldable steering wheel table for use in a motor vehicle, comprising:
   a. A planar table surface;
   b. A pair of table angle controls at a bottom of two opposite sides of the table;
   c. An arch shape support, with a radian of its inner side wall very similar to that of a steering wheel, pivotally connects to the table surface;
   d. One or more clamps on the support;
   e. A pair of angle-adjusting wheels, each pivotally connected to a respective lower side of said support, the pivots allowing the angle-adjusting wheels to rotate in order to adjust the level and angle of the table surface;
   f. A pair of table angle controls at the bottom of the table at each side, which forms a lever arm at each side of the table, which control and change the angle between the table surface and the support, wherein the angle control extends the length of arm of force from a table axle to the angle-control polygonal flange plate, which enables the table to sustain more weight;
   g. A pair of limit stoppers on a springing strip at a bottom of a support at each side; and
   h. An oblong slot and cup slot on each side on a table surface.

2. The foldable steering wheel table of claim 1 having a support, said support comprising one or more clamps on said support to mount the table on the steering wheel, wherein each clamp having a same or similar radian of the steering wheel at locations where the clamp attaches to the steering wheel to fit different handle's thickness of steering wheels.

3. In a foldable steering wheel table of claim 1 for use in a motor vehicle, said support having a same or similar radian of an outside edge of a steering wheel, such support covering upper half circle of a steering wheel and vertically extending below the center of a steering wheel to a planar table surface.

4. The said steering wheel table of claim 1, wherein said limit stoppers will not allow the support and table to fold or unfold without an extra force.

5. The said steering wheel table of claim 1, wherein the said oblong slot and cup slot greatly reinforce the strength of the table surface and provide storage spaces for things such as pens and utensils.

6. In an improved foldable steering wheel table for use in a motor vehicle, comprising:
   a. A planar table surface;
   b. A pair of table angle controls at a bottom of two opposite sides of the table;
   c. An arch shape support, with a radian of its inner side wall very similar to that of a steering wheel, pivotally connects to the table surface;
   d. One or more non-moveable latches or catches on the support;
   e. A pair of angle-adjusting wheels, each pivotally connected to a respective lower side of said support, the pivots allowing the angle-adjusting wheels to rotate in order to adjust the level and angle of the table surface;
   f. A pair of table angle controls at the bottom of the table at each side, which forms a lever arm at each side of the table, which control and change the angle between the table surface and the support, wherein the angle control extends the length of arm of force from a table axle to the angle-control polygonal flange plate, which enables the table to sustain more weight;
   g. A pair of limit stoppers on a springing strip at a bottom of a support at each side; and
   h. An oblong slot and cup slot on each side on a table surface.

7. The said steering wheel table of claim 6, having one or more latches or catches on the support, wherein each latch or catch having a same or similar radian of a steering wheel at locations where the latch or catch attaches to the steering wheel.

8. In a foldable steering wheel table of claim 6 for use in a motor vehicle, said support having a same or similar radian of an outside edge of a steering wheel, such support covering upper half circle of a steering wheel and vertically extending below the center of a steering wheel to a planar table surface.

9. The said steering wheel table of claim 6, wherein said limit stoppers will not allow the support and table to fold or unfold without an extra force.

10. The said steering wheel table of claim 2, wherein the said oblong slot and cup slot greatly reinforce the strength of the table surface and provide storage spaces for things such as pens and utensils.

11. In an improved foldable steering wheel table for use in a motor vehicle, comprising:
    a. A planar table surface;
    b. A pair of table angle controls at a bottom of two opposite sides of the table;
    c. An arch shape support, with a radian of its inner side wall very similar to that of a steering wheel, pivotally connects to the table surface;
    d. One or more moveable latches or catches on the support;
    e. A pair of angle-adjusting wheels, each pivotally connected to a respective lower side of said support, the pivots allowing the angle-adjusting wheels to rotate in order to adjust the level and angle of the table surface;
    f. A pair of table angle controls at the bottom of the table at each side, which forms a lever arm at each side of the table, which control and change the angle between the table surface and the support, wherein the angle control extends the length of arm of force from a table axle to the angle-control polygonal flange plate, which enables the table to sustain more weight;
    g. A pair of limit stoppers on a springing strip at a bottom of a support at each side; and
    h. An oblong slot and cup slot on each side on a table surface.

12. The said steering wheel table of claim 11, having one or more moveable latches or catches on the support, wherein each latch or catch having a same or similar radian of a steering wheel at locations where the moveable latch or catch attaches to the steering wheel.

13. The steering wheel table of claim 11, having one or more moveable latches or catches, wherein each moveable latch or catch can move along the support for a best position to latch or catch the support on a steering wheel.

14. In a foldable steering wheel table of claim 11 for use in a motor vehicle, said support having a same or similar radian of an outside edge of a steering wheel, such support covering upper half circle of a steering wheel and vertically extending below the center of a steering wheel to a planar table surface.

15. The said steering wheel table of claim 11, wherein said limit stoppers will not allow the support and table to fold or unfold without an extra force.

16. The said steering wheel table of claim 11, wherein the said oblong slot and cup slot greatly reinforce the strength of the table surface and provide storage spaces for things such as pens and utensils.

* * * * *